(12) United States Patent
Raposo

(10) Patent No.: US 8,128,033 B2
(45) Date of Patent: Mar. 6, 2012

(54) SYSTEM AND PROCESS OF VECTOR PROPULSION WITH INDEPENDENT CONTROL OF THREE TRANSLATION AND THREE ROTATION AXIS

(76) Inventor: Severino Raposo, Mem Martins (PT)

( * ) Notice: Subject to any disclaimer, the term of this patent is extended or adjusted under 35 U.S.C. 154(b) by 467 days.

(21) Appl. No.: 12/446,564

(22) PCT Filed: Nov. 2, 2006

(86) PCT No.: PCT/PT2006/000026
§ 371 (c)(1),
(2), (4) Date: Apr. 21, 2009

(87) PCT Pub. No.: WO2008/054234
PCT Pub. Date: May 8, 2008

(65) Prior Publication Data
US 2010/0301168 A1    Dec. 2, 2010

(51) Int. Cl.
*B64G 1/40* (2006.01)
(52) U.S. Cl. .................................... 244/171.2
(58) Field of Classification Search ............... 244/171.2, 244/23 A, 12.4, 17.23
See application file for complete search history.

(56) References Cited

U.S. PATENT DOCUMENTS

| 6,719,244 | B1 | 4/2004 | Gress |
| 2004/0026563 | A1 | 2/2004 | Moller |
| 2006/0226281 | A1* | 10/2006 | Walton .................. 244/17.23 |
| 2007/0023581 | A1* | 2/2007 | La .......................... 244/165 |
| 2009/0216392 | A1* | 8/2009 | Piasecki et al. ............ 701/3 |

FOREIGN PATENT DOCUMENTS

| FR | 1 257 191 | 3/1961 |
| FR | 1 287 816 | 3/1962 |
| FR | 2104709 | 4/1972 |

OTHER PUBLICATIONS

International Search Report from counterpart application No. PCT/PT2006/000026.

* cited by examiner

Primary Examiner — RIchard Price, Jr.
(74) Attorney, Agent, or Firm — Miller, Matthias & Hull LLP

(57) ABSTRACT

The present invention relates to a propulsion system of a vertical takeoff and landing aircraft or vehicle moving in any fluid or vacuum and more particularly to a vector control system of the vehicle propulsion thrust allowing an independent displacement with six degrees of freedom, three degrees of translation in relation to its centre of mass and three degrees of rotation in relation to its centre of mass. The aircraft displacement ability using the propulsion system of the present invention depends on two main thrusters or propellers and which can be tilted around pitch is (I) by means of tilting mechanisms and, used to perform a forward or backward movement, can be tilted around roll axis (X) by means of tilting mechanisms and, used to perform lateral movements to the right or to the left and to perform upward or downward movements (Z), the main thrusters being further used to perform rotations around the vehicle yaw axis (Z) and around the roll is (X). The locomotion function also uses one or two auxiliary thrusters or propellers and mainly used to control the rotation around the pitch axis, these thrusters or propellers and being fixed at or near the longitudinal is of the vehicle, with there thrust perpendicular or nearly perpendicular to the roll and pitch axis of the vehicle.

17 Claims, 7 Drawing Sheets

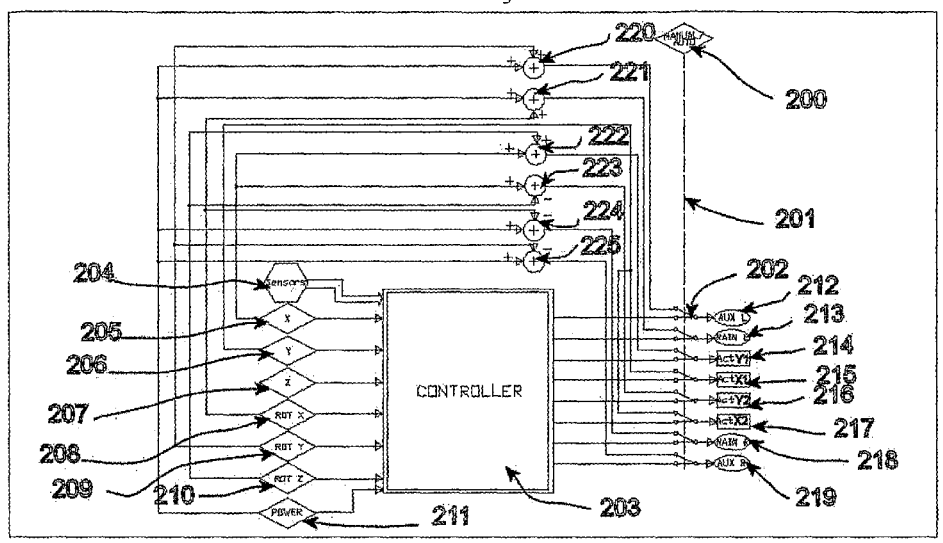

SYSTEM AND PROCESS OF VECTOR PROPULSION WITH INDEPENDENT CONTROL OF THREE TRANSLATION AND THREE ROTATION AXIS

CROSS-REFERENCE TO RELATED APPLICATIONS

This application is a U.S. national stage filing under 35 USC §371 of International Patent Application No. PCT/PT2006/000026 filed on Nov. 2, 2006.

FIELD OF THE DISCLOSURE

The present invention relates to a propulsion system for a vertical take-off and landing aircraft or vehicle capable of moving in any fluid or vacuum, more specifically it refers to a system of vector propulsion thrust control allowing independent movement with six degrees of freedom i. e. three degrees of translation in relation to its centre of mass or gravity and three degrees of rotation in relation to their centre of mass.

The motion ability of the aircraft depends on two main thrusters or propellers 3 and 4 which can be tilted around the pitch axis (Y) by means of tilting mechanisms 7 and 8, used to perform a forward or backward movement, that can also be tilted around the roll axis (X) by means of tilting mechanisms 7 and 8, used to perform a right or left movement and, to perform upward or downward movement (Z) by increasing or reducing thrust, the main thrusters being further used to perform rotation around the vertical axis (Z), and around roll rotation (X). The locomotion function also uses one or two auxiliary thrusters or propellers 11 and/or 12, used mainly to control the rotation around the pitch axis (y), these auxiliary thrusters or propellers 11 and/or 12 being able to be fixed or tiltable around one or two axis, roll and pitch axis.

The aircraft also includes control means having the ability to read all spatial and position parameters of the vehicle internal components (including the aircraft mass centre position 15) and other parameters that are processed using the internal control algorithm in order to maintain the user requested spatial orientation despite the existence of external forces like gust winds and turbulences, by using the propulsion system ability to control independently six degrees of freedom, thus countering any external force acting on the vehicle.

This invention is applicable to an aircraft, a space vehicle, a vehicle moving in a fluid medium, such as a submarine, a ROV (Remotely Operated Vehicle) or to an UAV (Unmanned Air Vehicle). It is also applicable to a toy in any of the aforementioned embodiments.

BACKGROUND OF THE INVENTION

Over the years a lot of different VTOL (Vertical Take off and landing) configurations where tested. These configurations can be seen in, Seth B. Anderson, "Historic Overview of V/STOL Aircraft Technology," NASA™ 81280, March 1981 (the site http://www.aiaa.org/tc/vstol/wheel.html as one copy of the implementation wheel of V/STOL aircrafts).

Most of these configurations were never used in commercial aircrafts. The different configurations can be classified in several possible ways, such as:
Same propulsion for hover and flight
Different propulsion for hover and flight
Augmented propulsion power for hover Each of these can be further divided in several subclasses like for example, wing Tilt, propeller tilt and so on.

The classification wheel does not include the helicopter. The helicopter is also a VTOL machine since it can also take off and land vertically, the difference to the VTOL wheel aircrafts being that the helicopter does not have fixed wings for providing all (or most) of the lift force for the aircraft when it moves forward.

Among all of these VTOL machines the helicopter (in all its different propulsion versions) is clearly the best commercial VTOL machine and the machine with more units throughout the world.

Among all the tested VTOL configurations merely five exist at present, most of them only in a military configuration, and these are as follows:
Helicopter (all versions included have the same propulsion for vertical and horizontal flight, with rotors),
the military Osprey V22 aircraft (same propulsion for vertical and horizontal flight, with tilt rotors),
the military jet Harrier (same propulsion for hover and flight, with vector thrust),
the military jet Yakovlev YAK-3B (different propulsion for hover and flight), and
the military jet Lockheed Martin X-35 (with a thrust increase system for hover, using a separate fan for VTOL operation).

Among these commercial airplanes it can be easily seen that the only civil VTOL aircraft is the helicopter. In the near future the convertible Bell Augusta BA609, which is similar to the Osprey V22, will be certified.

There is a number of reasons for the lack of success of most of the tested configurations for a VTOL aircraft, some of the reasons being: Very difficult control of take off and landing, very difficult control of the transition phase from horizontal to vertical flight, high cost and complexity, instability problems, large weight of several engines for horizontal and vertical flight and large weight of large shafts and gears, slow controls response time (aggravating instability), transmission failures, very high vibration and so on.

Among the enumeration of the problems of VTOL aircrafts it can be seen that a large portion of the problems is related to control.

Normal aircrafts, from an aerodynamic control point of view, can be classified in regard to their independent control axis as:
One forward translation axis (power) and three rotation control axis—conventional airplane
Three translation axis, up or down (power), forward or backward and left or right (due to the cyclic pitch of the main rotor, but some rotation occurring also in the pitch axis or in the roll axis) and one rotational axis—Helicopter (all types including the not so conventional with two main counter-rotating rotors).

Both of these configurations are not able to perform an independent control of three translation axes and three rotation axis.

Some built flying machines can, at least in theory, displace themselves according to most of the three translation and three rotation axis.

Among the previously referred VTOL wheel some aircrafts, like the Harrier, can, in the take-off (or landing) phase perform one translation and two rotations (pitch and roll axis) but only for a very short time.

It was previously mentioned that the helicopter comprises three translation axis, but in the helicopter and similar flying machines the translational displacement affects one of the rotation axis and as a result the translation displacements are not fully independent of the rotation axes.

When moving forward the conventional helicopter rotates also around the pitch axis, this meaning that the translation axis is not fully independent of the rotation axis, making it impossible for the helicopter to maintain the angle of the longitudinal axis with the horizon when moving forward or backward.

The existing patents do not cover the aforementioned problems, or just make some reference to them without proposing a feasible solution for a full vector three translational and three rotation axis control aircraft in a simple form.

In the case of spacecrafts there are solutions for this vector control, but the existing solutions are complex and demand large numbers of isolated thrusters.

The theoretically simple solution is to use two thrusters at the same distance symmetrically from Cg (Mass centre of aircraft) on the Y axis (lateral axis, right or left side), and two thrusters located on the X axis (front or back) and two more on Z axis. This configuration allows for a full vector aircraft control. However very costly because it requires the use of six equal thrusters or propellers, when actually most of the time only two will be used.

Several of the existing patents do not cover the problems mentioned previously, or just refer to them without achieving a complete solution for a full vector control (three translational and three rotation axis), thus allowing the implementation of a control algorithm that significantly increases the agility of the aircraft, spacecraft or vehicle moving in any fluid or vacuum, and reducing the external influence due to turbulence disturbances acting on the aircraft, thus increasing passenger comfort (in gust wind situations or others).

Patent U.S. Pat. No. 6,719,244 "VTOL AIRCRAFT CONTROL USING OPPOSED TILTING OF ITS DUAL PROPELLERS OR FANS" is a system using only two propellers counter-rotating without cyclic pitch-change using propellers tilting around two axis for counter acting the pitch axis change when the aircraft is moving forward. This cannot achieve full vector three translational and three rotational axes control.

Patent U.S. Pat. No. 6,607,161 "CONVERTIBLE AIRCRAFT WITH TILTING ROTORS" and similar patents U.S. Pat. No. 2,230,370 and U.S. Pat. No. 2,702,168 are convertible aircrafts with only two opposed rotors that only tilt forward and backward but not laterally, like the present invention.

Patent U.S. Pat. No. 3,106,369 "AIRCRAFT AND METHOD OF OPERATING SAME" has some similarities to the two tiltable main rotors (with cyclic pitch-change) and a jet which helps controlling aircraft pitch. Again, the aircraft does not tilt the main rotors around two axes, only one, and for moving laterally it uses the cyclic pitch-change. This cannot accomplish full vector three translational and three rotational axes control of the aircraft.

Patent U.S. Pat. No. 3,141,633 "TILT-WING AIRCRAFT" is a tilt wing aircraft and has a number of rotors on the wing with an additional located in the back for aircraft pitch control, it only moves the rotors in one axis, and again it cannot accomplish a full vector aircraft control.

Patent U.S. Pat. No. 6,708,920 "AIR VEHICLE" uses four main identical fans that are tiltable around two axes (roll and pitch.) This different from the present invention using two main thrusters or propellers or jets tilting around two main axes and two small auxiliary thrusters or propellers or jets fixed in their rotation axes. Other differences are the concern of patent U.S. Pat. No. 6,708,920 with the engine and fan shapes, positions and cooling thereof and not with the full vector ability (independent rotations of the vehicle are not predicted). The possibility to counteract gust and turbulences is not mentioned.

Patent U.S. Pat. No. 5,419,514 "VTOL AIRCRAFT CONTROL METHOD", relates to a method of increasing the stability of a VTOL, aircraft, not being a full vector control method.

Patent U.S. Pat. No. 6,808,140 "VERTICAL TAKE-OFF AND LANDING VEHICLES" has a similar configuration but the main thrusters are aided by vanes that alter the air flow direction, and the main fans only rotate around the pitch axis (from the partially vertical position to full horizontal position parallel to flight direction). It cannot be full vector.

Patent U.S. Pat. No. 3,544,042 "AERODYNE WITH VERTICAL TAKE-OFF OR LANDING MEANS" uses a similar configuration but doesn't have auxiliary propellers for additional control, therefore it cannot be full vector.

Patent U.S. Pat. No. 1,851,764 "AEROPLANE" is a similar configuration, in some aspects, the main propellers being rotatable around two axis but these are always synchronized and cannot be tilted independently. This patent does not include auxiliary propellers or jets as the present invention.

Patent U.S. Pat. No. 6,892,980 "VERTICAL TAKEOFF AND LANDING AIRCRAFT" is, from a control point of view, similar to patent U.S. Pat. No. 6,708,920 but uses only one turbofan engine that drives the four two axis tiltable propellers and it has wings making it a convertible aircraft. The configuration described by this patent is a rectangle where the four tiltable propellers are placed in the corners. This placement and the identical four propellers or fans differ from the present invention. Nowhere in the patent is referred the possibility to counteract the influence of turbulence, thus allowing, the increase in passenger comfort. The aircrafts control is made by propeller or fan rotation and not by RPM (rotations per minute) changes or changes in the propeller pitch combined with the propeller or fans tilting, this differing from the present invention.

The present invention is intended to solve the aforementioned problems by using a propulsion central system according to claim 1. The additional embodiments will be apparent from the dependent claims.

SUMMARY OF THE INVENTION

This invention relates to an aerospace propulsion system with the capability to independently control the movement according to three translational axes and three rotation axis, in relation to their mass centre or gravity centre, with six degrees of freedom.

More specifically the present invention is a propulsion system for a vehicle moving inside a fluid or in vacuum with the capability to move according to three independent translation axis and three independent rotation axis, the vehicle comprising at least two main thrusters, connected to the vehicle by attachment means comprising tilting mechanisms and joining means, said tilting mechanisms being able of tilting the main thrusters around two axis, pitch and roll, independently from each other, characterized in that the geometric centre of the arrangement of said tilting mechanisms is localized at or in close vicinity of the mass centre of the vehicle, and in that the vehicle has at least one auxiliary thrusters provided with attachment means comprising independent tilting mechanisms and joining means, arranged to allow tilting around two axis, pitch and roll, the geometric centre of the arrangement of the independently tilting mechanisms of said main and auxiliary thruster(s) being located on the longitudinal axis of the vehicle, and the vehicle being provided with control means configured to control the thrusters and their corresponding tilting mechanisms.

The present invention further relates to a process of propulsion for a propulsion system according to claim 1, for a vehicle able to move according to three independent translation axis and three independent rotation axes characterized in that:

translational movements over the horizontal plan is obtained by tilting all the tilting thrusters, around their tilt axis perpendicular to the intended translational movement, and also by changing the global thrust of the thrusters in such a way as to maintain the vehicle altitude, translational movement along the vertical axis is accomplished by having all the tilting thrusters in the vertical tilt position by increasing the thrust of all the thrusters so that the overall thrust is bigger than the vehicle weight in order for the vehicle to ascend and reducing the thrust to less than the vehicle weight for the vehicle to descend, rotation around the vertical axis is done by tilting the tiltable thrusters around the axis connecting these tilting mechanisms, at equal angle of a tiltable thrusters in relation to its opposed tiltable thrusters, in modulus, but with opposite signal, and also by changing the thrust to maintain altitude, rotation around the axis defined by the attachment means of the tilting mechanisms of two main thrusters is accomplished by changing the thrust in the auxiliary thruster(s), and using a thrust perpendicular to the axis joining the tilting mechanisms, the main thrusters tilting in the opposite sense to that of the rotation of the vehicle and by also changing the thrust of the thrusters in order to maintain altitude, rotation around the axis orthogonal to the previous axis and the vertical axis is done by a different thrust in the main thrusters and by tilting the same in the sense opposite to the vehicle rotation and also by changing the thrust of the thrusters in order to maintain altitude, and wherein, in the event of using propellers, these are placed in opposition, the propellers turning in counter rotation in order to compensate the torque adding on the vehicle.

The present invention further relates to the use of the aforementioned propulsion system and propulsion process in aircrafts or spacecrafts or any other vehicle moving inside a fluid or in vacuum.

The preferred embodiments of the present invention are set forth in the accompanying claims.

The translational axis, as set forth in the present invention, are: front or back, right or left and up or down; the rotational axis as set forth in the present invention are: vertical, longitudinal (roll) and lateral (pitch).

It is to be understood that, except otherwise stated, the word thruster will designate a thruster, for instance a rocket or ionic engine or similar, that generates thrust or a propeller or a shrouded propeller.

It is to be understood that the term aircraft, in the context of the present invention application, refers to any vehicle moving inside any fluid or vacuum, except if otherwise indicated.

It is to be understood that, in the context of the present invention application, when the aircraft uses propellers, each one is rotated by at least one independent engine.

It is to be understood that, in the context of the present invention application, one aircraft comprises three axes (that run through the mass centre), the longitudinal axis (roll), the lateral axis (pitch), and the vertical axis, these axis being orthogonal between them. The roll axis of the aircraft is parallel to the standard direction (translational) of the movement (forward or backward) of the aircraft, the lateral (pitch) axis is perpendicular to the roll axis and forms with it a spatial plan that is parallel to the plan where the pilots sit on, and the vertical axis is orthogonal to the other two axis.

It is to be understood that, in the context of the present invention application, the front or frontal part of the aircraft is the part that is located in the longitudinal axis furthermore from the mass centre in the direction of the pilot eyes.

The rear is the part that is located on the longitudinal axis furthermore from the mass centre in the inverse direction of the frontal part.

The distance between the front and the rear is the length of the aircraft.

It is to be understood that the expression "near the mass centre", in the context of the present invention application, means that the location is at a distance between zero and twenty per cent of the length of the aircraft, except otherwise mentioned.

It is to be understood that "tiltable thruster" consists of any thruster that has a tilt mechanism allowing its tilting around two axis, roll and pitch.

It is to be understood that "opposite tiltable thruster" refers to the tiltable thruster on the other end of the line that passes through the tilting mechanisms of both tiltable thrusters.

It is to be understood that, in the context of the present invention application, the main thrusters are always tiltable around two axis, roll and pitch, the axis connecting their tilting mechanisms passes at or in close vicinity of mass centre of the vehicle and they alone can, in the event of the vehicle being under the gravity of a body, like the earth, lift the vehicle. In the event where the aircraft is a spacecraft or a submarine (in this case the impulsion force of the water equals the weight of the vehicle), then the main thrusters are the ones that produce more thrust, and that the axis connecting their tilting mechanisms passes at or in close vicinity of the mass centre.

It is to be understood that, in the context of the present invention application, the auxiliary thrusters are the remaining thrusters.

The movement along all the axis of the vehicle is computed by an internal controller (or controllers) that receives all the necessary parameters, and also the user commands, and calculates, using its control algorithm, the necessary action to act on the engines and on the tilt axis of the main thrusters, pitch and roll to be able to follow the user commands counteracting the external aerodynamic perturbations, thus increasing the passengers comfort. This is a big improvement to the passengers, since in the event of external turbulent winds the present invention considerably reduces the passenger's discomfort.

The aircraft can, for example, move forward or laterally maintaining the longitudinal axis of the aircraft unchanged relatively to the horizon (not possible for a conventional or less conventional helicopter).

The invention operates in the following manner in the event of the embodiment with two main thrusters and two auxiliary thrusters mounted at the front and rear of the vehicle:

The main thrusters can rotate (tilt) around the pitch and roll axis and are counter rotated with equal RPM, this minimizes the overall moment in the aircraft as well as the gyroscopic forces on the aircraft.

The two main thrusters are mounted in such a way that they can rotate around the pitch axis from the vertical (propeller axis) position to the horizontal position (normal case, plus or minus ninety degrees, but it can be more or less), this allows the forward or backward motion. This tilt can be simultaneous or independent. If the propellers are tilted simultaneously (pitch axis) producing forward movement, the aircraft increases the RPM or the propellers pitch angle in order to maintain the aircraft altitude.

The main thrusters can also rotate laterally (roll axis) synchronized or independently. This synchronized tilt allows lateral motion, left or right, the RPM or the propellers pitch angle being increased to maintain altitude.

The main thrusters can also tilt symmetrically in opposition to each other around the pitch axis, leading the aircraft to rotate around the vertical aircraft axis (yaw), increasing simultaneously the thrust or RPM or changing the propellers pitch angle to maintain altitude.

The upward or downward movement is made by simultaneously increasing or reducing the thrust of the thrusters, in the event of using propellers by increasing RPM in fixed pitch propellers or by increasing pitch angle in variable pitch angle propellers.

The main thrusters can also rotate in both pitch and roll axes allowing the vehicle to move diagonally and in order to maintain altitude the RPM is increased in fixed pitch propellers or by increasing pitch angle in variable pitch angle propellers, and if the pitch angle of the thrusters is different, the aircraft can at the same time rotate around the yaw axis (some movements may need to be stabilized through the auxiliary propellers). If at the same time the power is increased sufficiently in both thrusters and propellers, then the aircraft also moves in the upward direction.

The main thrusters can also be used with different thrusts on left and right thrusters or propellers in order to perform a rotation around the longitudinal axis (roll) of the vehicle, but they have to be tilted around pitch axis (the rotation can be different) in order to compensate the moment (yaw axis torque) induced on the vehicle by the different thrust forces on each main thruster. In the event of the right propeller including another one rotating in its axis with equal angular momentum but rotating in the opposing sense, and a similar situation occurs in the main left propeller, then it is not necessary to change the pitch in order to obtain a roll rotation.

The auxiliary thrusters are used for two main reasons:
  Independent control of the pitch axis of the aircraft (changing thrust force by changing thrusters thrust or by changing RPM or the pitch angle of the front propeller in relation to the back propeller); in this case some compensation of the torque on the yaw axis has to be made by the main propellers and also it is necessary to compensate the tilt around the pitch axis of the main propellers so as to maintain the aircraft, if required, with the same altitude relative to the ground; if each thruster has two counter rotating propellers with individual absolute torque then this compensation is not needed.
  Compensation of the moment induced by the main propellers if their resultant thrust axis is not fully aligned with the Cg (gravity centre).

The system has a simple independent control to perform upward or downward motion, lateral motion and forward or backward motion, and also rotation around the vertical axis (yaw).

The independent control of the pitch and roll angles is more complicated since it requires the main thrusters and the auxiliary thrusters to be involved in a more complex control system (if each propeller is not double counter rotated and with same absolute torque).

The invention can also be used in a VTOL aircraft configuration in a convertible form, with tandem wings (wings that produce lift force both in the back and in the front) instead of a main wing like a conventional convertible aircraft such as the Osprey V22.

The present invention can be applied to a spacecraft, the thrusters being rocket engines or ion engines or any other suited thruster types. The invention can also be applied to an aircraft, but it can also be applied at any other vehicle moving in a fluid, such as water.

The present invention can be applied to the propulsion system of a submarine or a submarine ROV (remote operated vehicle), it can be applied to an airship, it can also be applied to a toy moving inside a fluid (or vacuum) and to autonomous vehicles moving inside vacuum or any fluid.

BRIEF DESCRIPTION OF THE DRAWINGS

FIG. 17 is a simplified view of the diagram of the aircraft control.

DETAILED DESCRIPTION OF THE PREFERRED EMBODIMENTS

Figure 1:
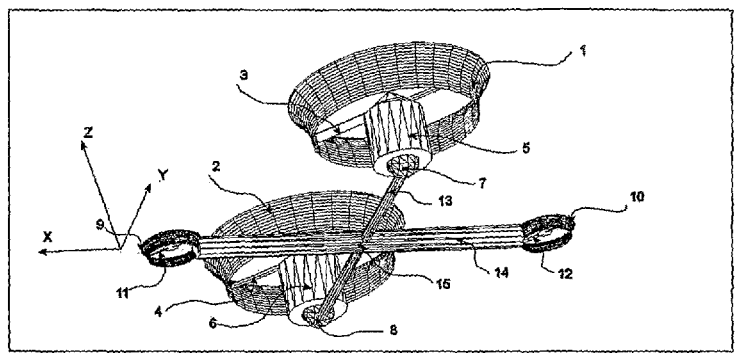
FIG. 1 is a perspective simplified bottom view of the main elements of the present invention in one preferred embodiment.

In the preferred embodiment, the present invention comprises two thrusters designated as main thrusters, that are independently moved (by any kind of engine) and are counter rotated, and which are placed laterally in the aircraft, with independent thrust variation or RPM variation or propellers pitch change (they can however be synchronized), being tiltable around two axis, positioned in such a way that their resultant thrust force, in all the possible configurations of the aircraft (take off, landing and horizontal flight), passes at or in close vicinity of the Cg, in the event of equal tilt and equal RPM or propellers pitch angle. There are also provided two thrusters or propellers (moved by any kind of engine) counter rotated, with independent control of thrust or RPM or propellers pitch change (they can however be synchronized), placed at the front and at the rear of the aircraft, these being fixed (not tiltable). In other variation of this embodiment these auxiliary thrusters or propellers also comprise two tilt axis (or one tilt axis), like the main thrusters. These thrusters are referred as auxiliary thrusters.

In the preferred embodiment, the roll axis of the aircraft comprises in its proximal end (or in close vicinity) one auxiliary thruster and in the other near (or in close vicinity) the other, the two auxiliary thrusters not being able to tilt, and when their propulsive force is identical, the resultant of the forces on the auxiliary thrusters passes at or in close vicinity of Cg. To perform a forward movement the aircraft moves in the same direction of the roll axis.

In the preferred embodiment, the aircraft uses independent engines for each one of the propellers connected directly to the propellers shaft without transmission gears, like for example the Osprey V22, so as to reduce weight of the aircraft.

The structural support of the main engines is calculated to resist the forces created by the rotation of the engines (rotating masses and gyroscopic effects and airflow interactions). The engines and moving structures (like fans or propellers) are as light as possible. This allows for the control speed of the thrusters (roll and pitch) to be very fast, which in turn allows enough time for the aircraft control system to calculate a counter action (which includes the main thrusters and auxiliary thrusters) in the case of external turbulence or gust wind, this diminishing the internal random accelerations and increasing the passenger and pilot comfort.

The main thrusters are tiltable around the pitch axis by an electrical drive engine (or other mechanical drive system), the same applying for the roll tilt. The electrical drive engines are fed by generators mounted in each explosion engine.

In the preferred embodiment the auxiliary thrusters are fixed (cannot tilt like the main thrusters) only the thrust or the RPM or the propeller pitch angle being controlled, end they are located at the maximum possible distance from the Cg (on the longitudinal axis of the aircraft) to minimize the size and power requirements of the engines. This assures the maximum possible aircraft pitch control action.

In the preferred embodiment the main thrusters are propellers with internal tiltable fans, thus increasing the static thrust, when compared with a single propeller, the same configuration being used for the auxiliary propulsion system. The propulsion can also use only propellers or even sophisticated augmented thrust propulsion systems like the one described in U.S. Pat. No. 4,796,836 or any other.

The engines for the propellers (main and auxiliary) can be independent electrical or explosion engines (two or four strokes or rotative), or turbines or any other rotating engine.

The present invention, in any of the aircraft embodiments, can be used in two different forms:
  Vector without wings
  Vector with wings (convertible VTOL aircraft)
In the vector without wings mode, the present invention has no autorotation capability because of the small size of the propellers, but safety is assured by the use of a ballistic parachute for the whole aircraft, and in the version with electrical engines, since each propeller uses several electrical engines, this allows the normal propeller function through power compensation of the remaining electrical engines (this can also be achieved by other engine types).

If one of the main independent engines fails, the aircraft electronic controller automatically shuts down the working engine (to avoid rotation around the yaw axis and the roll axis) and automatically the parachute is deployed, this parachute being also able to be activated manually.

The aircraft, on the preferred embodiment, in the vector with wings version has fixed wings in a tandem wings configuration (wings that produce lift at the front and back of airplane) to allow it to work as a convertiplane aircraft. In this configuration the aircraft, in a simplified version, does not use conventional airplane controls like the ailerons, it uses only the two main thrusters and the two auxiliary thrusters to provide all the required control (again there are three translational axes and three rotational axes control).

The aircraft, in a simplified version, comprises also control of the rudder, in a more complete (and expensive) version the aircraft can comprise full airplane controls and also the full vector control already described.

The controller of the aircraft can be a single one, or three or more involved in a majority decision process. The controller reads all the needed parameters such as, longitudinal axis position, vertical axis position, lateral axis position, X (forward), Y (lateral), Z (up) speeds and accelerations, main thrusters, pitch and roll position, RPM or prop pitch of auxiliary and main thrusters, velocity of external fluid, temperature, pressure, altitude, forces internal resultant and moments and also the user input controls, it also computes at every instant the position of the Cg.

The control algorithm is any that allows user control according to three translational axes and three rotation axis, minimizing external disturbances over the aircraft, like gust winds or aerodynamic turbulence.

In the event of full controller failure the electrical system can receive the user commands directly and pass this information to the main thrusters and auxiliary thrusters, but the aircraft looses the gust or turbulence resistance capacity because it cannot calculate the best way to counteract the external turbulence. This security feature uses a switch MANUAL/AUTO to change the mode from automatic control to manual control, this characteristic being applied to all the embodiments of the present invention in the aircraft form.

Because of the counter rotation of the main and auxiliary propellers the aircraft is stable and easy to control even in manual mode.

The propellers for the first embodiment can be of any type with any necessary number of blades. The propellers can be very simple, with fixed pitch or more complicated, with variable pitch, and can even have cyclic pitch.

The preferred embodiment can also use all the auxiliary thrusters with tilting capability in two axes, or just tiltable in one axis or fixed.

In another embodiment of the present invention the main thrusters are positioned on the longitudinal axis and the secondary thrusters are positioned on the lateral axis of the aircraft.

In this case the conversion to airplane mode is made by carrying out a ninety degrees rotation on the axis connecting main engines. The roll axis, in the airplane conversion mode will have two in-line (in the forward, backward direction) main thrusters.

In this embodiment it is possible to use only one thruster for the forward displacement, which is a much more stable configuration in airplane mode, in the event of one main engine failure. If used in a convertible configuration it can use normal airplane wings (more or less centred in the aircraft longitudinal axis, near the Cg) with inside thrusters mounted near the end (or at the end) of the wings, performing the same function of the auxiliary thrusters of embodiment one, but with control for roll and pitch exchanged.

In another embodiment the aircraft uses only one auxiliary thruster, which can be placed at front or back of the aircraft, this auxiliary thruster having the capability to produce upward and downward forces (by rotating clockwise or counter-clockwise the propeller or by changing the prop pitch angle maintaining the same rotation direction), alternatively two propellers can be used for the auxiliary thruster, each rotating in opposing directions, one for the upward force and the other for the downward force, with both props rotating in the same spatial axis. The use as a convertible is the same as the embodiment one in FIG. 1.

In all of the embodiments it is possible to use double propellers. This means that each thruster moves two counter rotating propellers in the same axis. This increases the aerodynamic efficiency and reduces the angular moment over the aircraft and the gyroscopic forces generated by the tilt of the main engines.

All of the previous possible embodiments of the present invention can use thrust augmentation devices such as the one described in patent U.S. Pat. No. 4,796,836.

Other embodiments are also possible with more than four main thrusters tiltable around the pitch and roll axis.

FIG. 1 is a view from below of the preferred embodiment in a simplified representation.

With reference to FIG. 1 the axis (X) pertains to the forward translation motion, axis (Y) is the lateral axis and (Z) is the upward or downward translation axis. The (X) axis is parallel to the longitudinal aircraft axis 14, the (Y) axis is parallel to aircraft main thrusters support axis 13. The aircraft mass centre Cg is 15 and is located at the intersection of the longitudinal aircraft axis 14 with the lateral axis 13 (or in close vicinity).

In FIG. 1 supports 13 and 14 are a very simplified representation of the actual supports, intended for helping to understand the invention.

In FIG. 1 there are two main thrusters and these alone can lift the aircraft, and there are also two thrusters intended mainly for the aircraft pitch control.

In a implementation of the preferred embodiment of an aircraft, the main propellers are driven by two 48 Hp two stroke engines with 32 Kg weight and about 6200 RPM (maximum) commercially available from manufacturer Simonini. The engines comprising a reduction gear (belt) of 1:2.7 for driving a 1620 mm diameter propeller. The engine and propeller assembly has a 1340N maximum lifting force. Through the use of shroud 1 the thrust of propeller 3 can be augmented. Shroud 2 also increases the total thrust of propeller 4. Propeller 3 rotates counter clockwise and propeller 4 clockwise (as seen above). The total diameter of the shroud is 1900 mm. This leads to a very small sized aircraft. The example of the embodiment is designed to withstand a person weighing less than 100 Kg for a maximum of three hours flight time.

The main engines can be different, like for example a light four strokes engine or an electrical one.

Item 7 is the two axis (pitch and roll) tilting mechanism for engine 5 and propeller 3 and shroud 1. The tilt can be a tilt forward (on the Y axis), to about 90°, or around the (X) axis.

The two axis rotation tilt mechanism 7 uses two electrical engines, in present example a 40 Nm engine weighing 2.4 Kg is used in each tilt axis.

The right engine 6 is identical to engine 5 but rotates in the opposite direction.

Shroud 2 increases the lift force in takeoff and landing situations. The tilting mechanism 8 of engine 6 and their attached systems are also moved, by two electrical engines of 40Nm. The electric power for the aircraft and also for the electrical tilting mechanism comes from generators (not shown on figures) attached on main engines. The tilting mechanisms 7 and 8 each comprises two tilt axes (roll and pitch).

The front auxiliary propeller 11 also uses an increase thrust through shroud 9, and in the back of the vehicle the same situation occurs, this time for propeller 12 and shroud 10. The auxiliary propeller rotation of front prop 11 is counter-clockwise and the back propeller 12 clockwise (the rotation senses may be reverse, the same situation occurs for the main propellers).

The distance of the centre of the intersection of the roll and pitch axes (About Cg) to each of the left and right tilting mechanism centre is 1.4 m (although it could be larger). The distance from Cg to auxiliary propeller axis is 1.5 m (can also differ in different aircraft versions). The auxiliary propellers are powered by electrical engine with 1.5 KW power and 400 g weight delivering 70N thrust, the propellers are 380 mm diameter.

The structure of the aircraft, in the preferred embodiment, is made based on support 13 of main thrusters. Support 13, in the present example, is of a dihedral shape in order to allow a bigger roll angle of main engines. The pilot is seated with is mass centre positioned at the same (or in close vicinity) point of the Cg of the entire aircraft.

Because of the counter rotated propellers for the main and auxiliary propellers the aircraft is much more stable than a conventional helicopter with just one main rotor. Because of this characteristic learning to fly the vehicle is easy.

The aircraft comprises a low cost digital controller which takes the sensors readings and user commands and carries out the computation of all the needed variables for the control of the main and auxiliary engines and tilting systems.

The aircraft can move independently according to three translational axis, (X) forward or backward, (Y) right or left and (Z) upwards or downwards. It has also the capability to move independently around three rotational axis, rotation around (Z) axis (yaw), rotation around (X) axis (roll) and rotation around (Y) axis (pitch). Due to this it is a full vector aircraft.

Figure 2:
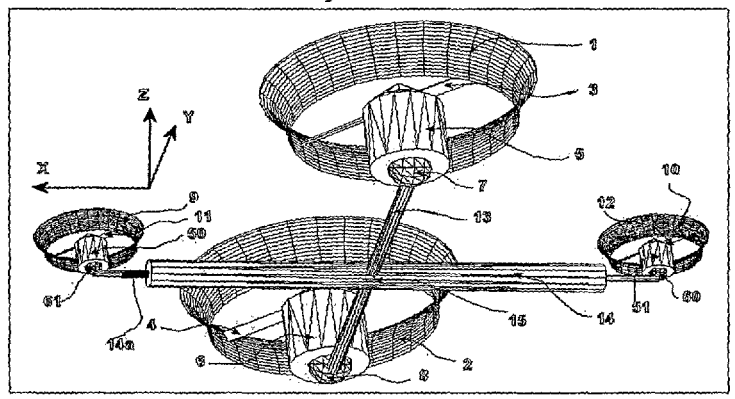
FIG. 2 is a perspective simplified bottom view of the main elements of the present invention in another preferred embodiment, in which the auxiliary thrusters have two tilt axis.

The FIG. 2 shows other embodiment in which the auxiliary thrusters also tilt around two axis, roll and pitch. The front auxiliary thruster comprising an engine 50 connected to the structure by 14a, mechanism 61 allowing tilting around two axis, the back thruster using engine 51, the tilt mechanism 60 allowing tilting around two axis, and being connected to the structure by 14a (simplified version).

Figure 3:
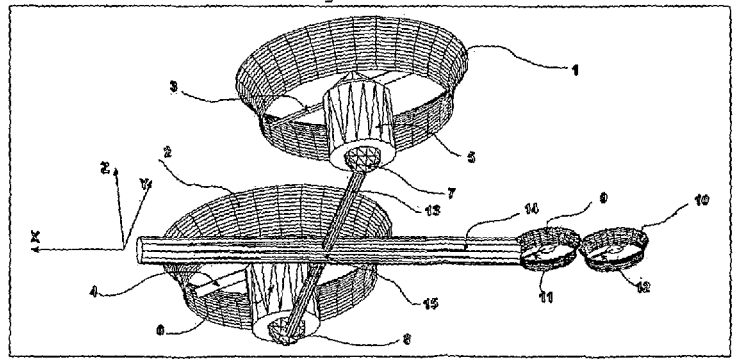
FIG. 3 is a perspective bottom view, of another embodiment, with the main thrusters mounted together at the rear (or at front) of the vehicle, where one of them produces upward force and the other downward force.

The FIG. 3 is a perspective view from the bottom of another embodiment with the auxiliary thrusters jointly placed on the longitudinal axis of the vehicle, in which thruster 11 produces upward force and thruster 12 downward force (or the opposite). The thrusters can be located at the rear or at the front in the longitudinal axis of the vehicle.

Figure 4:
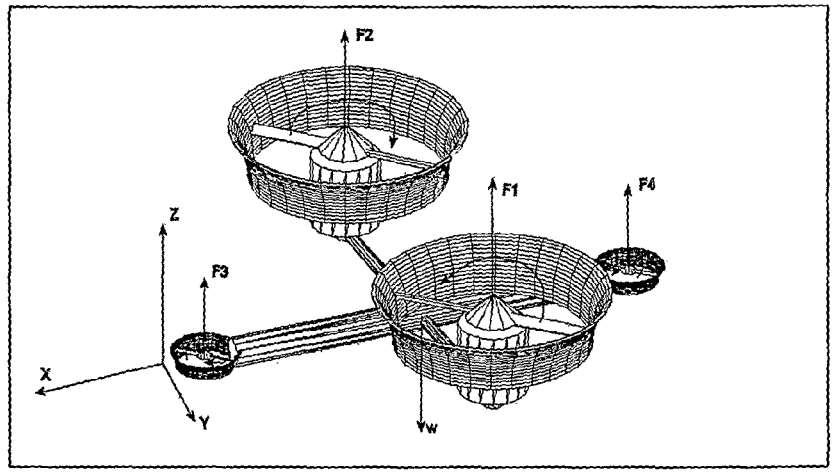
FIG. 4 is a simplified view of the aircraft in the preferred embodiment of FIG. 1 in a takeoff or landing configuration (up, down translational axis).

FIG. 4 shows the independent translational movement up or down in the preferred embodiment of the FIG. 1.

With reference to FIG. 4 (X) is parallel to the forward or backward translational axis, (Y) is parallel to the left or right aircraft axis and (Z) is parallel to the up or down axis of the aircraft. In FIG. 4 there are four thrust forces (F1) from the left main thruster, (F2) from the right main thruster, (F3) from the forward auxiliary thruster and (F4) from the backward auxiliary thruster. These forces are in-line with the (Z) axis, so total upward force is:

Total Z force=$F1+F2+F3+F4$

This total force must be greater than or equal to the weight of the aircraft (W).

The aircraft moves only in the Z axis (if there are no outside wind or external forces). If total Z Force is greater than W (weight) the aircraft goes up and, if the Total Z force is less than W then the aircraft goes down. The moments affecting the aircraft are null because of the symmetry of all forces relatively to the Cg.

Figure 5:
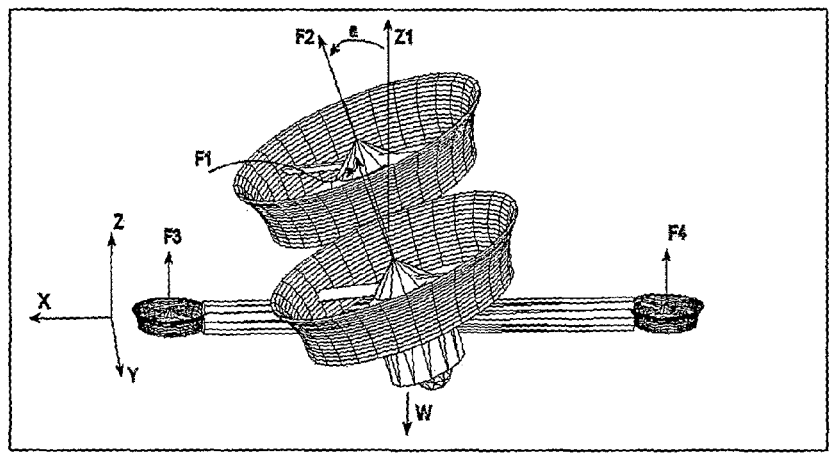
FIG. 5 is a simplified view of the aircraft in the preferred embodiment of FIG. 1 moving forward (forward, backward translational axis).

With reference to FIG. 5 the aircraft has both thrusters tilted around the pitch axis (rotated to the front of the vehicle). Both main propeller axes are at an angle (a) with the (Z) axis. The conditions for the vehicle to move forward (translation in X axis alone) are:

For the vertical Z component $F1 \cos(a)+F2 \cos(a)+F3+F4=W$

But F1=F2 and F3=F4 so:

$2F1 \cos(a)+2F3=W$

For the horizontal X component:

$Fx=F1 \sin(a)+F2 \sin(a)=2F1 \sin(a)$

Fx=Forward motion force (X) axis

Because of the symmetry of all the forces in relation to the Cg of the vehicle, the moments affecting it are null.

The vehicle moves forward solely along the translation (X) axis if the upward forces are always equal to the Weight (W). Because of this when the main propellers tilt forward at the same angle (a) the RPM or the pitch change of the propellers are increased in order for the upward force to equal the weight of the aircraft.

The auxiliary thrusters maintain their forces, before and after the tilt motion. But other ways to maintain solely (X) translation motion are possible, (F3) and (F4) forces can also be varied and the thrust of the main engine can be slightly reduced, the condition being that the vector sum of all forces acting on axis (y) equals the weight of the vehicle.

Figure 6:
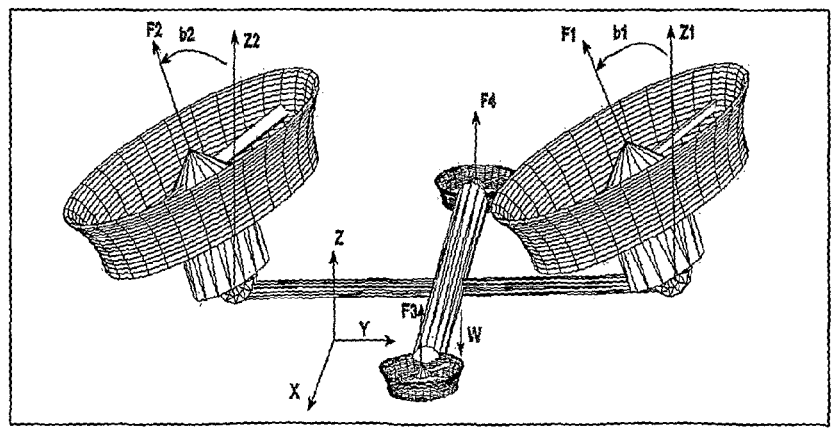
FIG. 6 is a simplified view of the aircraft in the preferred embodiment of FIG. 1 moving sideways (right side, left side translational axis).

FIG. 6 is a simplified representation of the conditions for the aircraft to independently move laterally (Y axis translation) in the preferred embodiment of FIG. 1.

In this case, both main thrusters are again tilted around the roll axis simultaneously at the same angle, in this case angles (b1) and (b2) (b1=b2) to the vertical (Z) axis. The conditions for the aircraft to move only in the (Y) axis are:

For Z axis: $F1 \cos(b1)+F2 \cos(b2)+F3+F4=W$
With F1=F2 and F3=F4 we have: $2F1 \cos(b1)+2F3=W$
The motion force in Y axis will be: $Fy=2F1 \sin(b1)$ The moments affecting the aircraft are again zero. Basically for the vehicle to move solely along the (Y) axis the aircraft tilts both main thrusters, around the roll axis, at the same angle and at same time increasing the RPM or pitch change so the (Fz) component remains unchanged all the way through the tilting.

Figure 7:
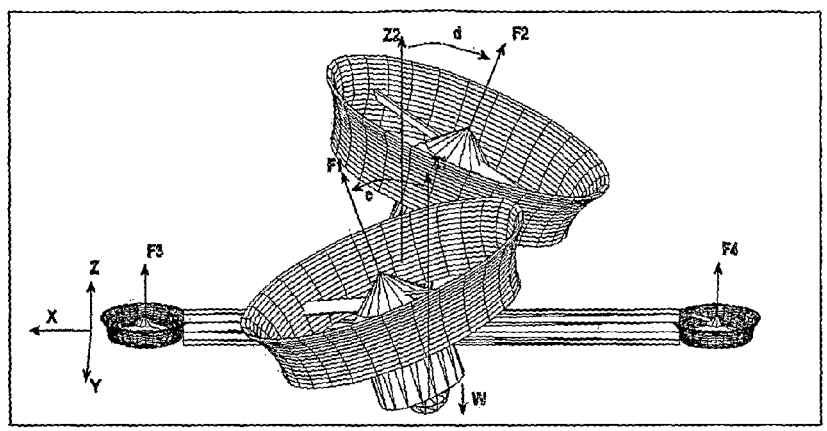
FIG. 7 is a simplified view of the aircraft in the preferred embodiment of FIG. 1 performing a rotation around to the vertical axis.

FIG. 7 is a simplified representation of the preferred embodiment of FIG. 1, locating to rotation around the vertical axis (Z).

In this case the aircraft has both thrusters tilted around the pitch axis, but the left thruster is tilted at angle (c) forward and the right is rotated at angle (d) backward. The angles (c) and (d) are equal in modulus but reverse in directions. The conditions for independent rotation over (Z) axis are:

$Fz=W=F3+F4+F1 \cos(c)+F2 \cos(d)$

Usually F3=F4 and F1=F2 so:

$Fz=2F3+2F1 \cos(c)=W$

The moment around Z axis is:

$Mz=2LF1 \sin(c)$

L=Distance between Cg and the centre of thrust force (for example F1) of one of the main thrusters.

Again, during the rotation around (Z) axis, the aircraft needs to increase thrust or RPM or props pitch to maintain altitude.

Figure 8:
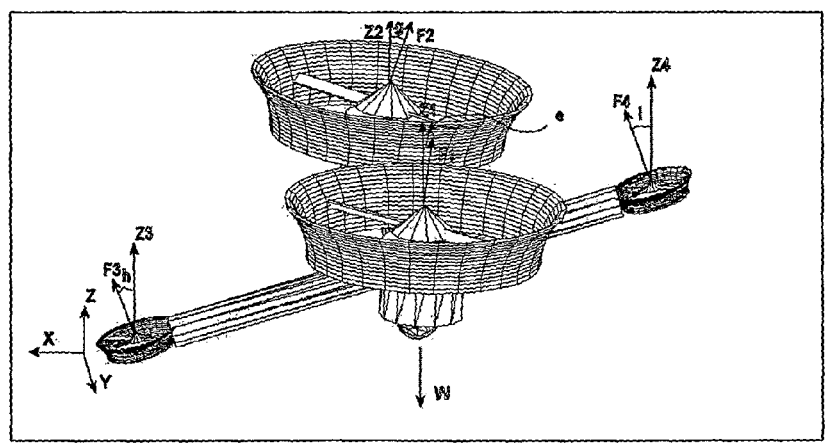
FIG. 8 is a simplified view of the aircraft in the preferred embodiment of FIG. 1 performing a rotation around the lateral (pitch) axis.

FIG. 8 shows how the aircraft, in the preferred embodiment of FIG. 1, performs an independent rotation around (Y) axis (pitch).

For this movement the forces (F3) and (F4) of the auxiliary thrusters must be different. This creates a moment around the (Y) axis. To maintain the aircraft altitude the following condition must be achieved:

$F3 \cos(h)+F4 \cos(i)+F1 \cos(e)+F2 \cos(g)=W=Fz$

In this case F1=F2 and angle (h) is equal to angle (i).
This simplifies the previous formula:

$W=(F3+F4)\cos(h)+F1(\cos(e)+\cos(g))$

For the aircraft not to move forward (or backward) another condition is needed:

$(F3+F4)\sin(h)+F1(\sin(e)+\sin(g))=0=Fx$

The moment around Y axis is $My=SF3+SF4=S(F3+F4)$
S=Length from Cg to centre of thrust of one of the auxiliary propellers, is assumed as being equal in the case of both auxiliary thrusters.

The yaw moment is:

$F1 \sin(e)+F2 \sin(g)=Mz$

Mz=Moment in (Z) axis, because of the different moments caused by the auxiliary propellers.

The moment around the aircraft longitudinal axis (XI) must be zero, so:

$Mx1=LF1 \cos(h+e)+LF2 \cos(g+h)=0$

All other forces and moments are zero.

Figure 9:
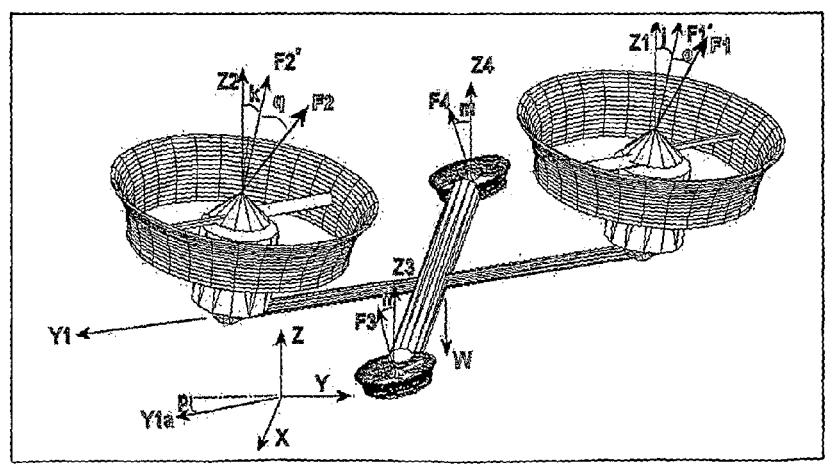
FIG. 9 is a simplified view of the aircraft in the preferred embodiment of FIG. 1 performing a rotation around the longitudinal (roll) axis.

FIG. 9 shows the last independent axis movement, in this case the rotation around (X), (X) being the roll axis of the aircraft.

In order for the roll axis rotation of the aircraft to occur the thrust force of main thrusters must not be equal, thus generating a roll moment. This creates a (Z) axis moment (yaw), because of the different forces (F1) and (F2), if the propellers are not double and with compensated moments for each thruster, this yaw moment must be compensated. Also the axis of forces (F3) and (F4) rotate in space.

(F1') is the projection of (F1) in the plane that passes through (Z) and the lateral axis of the aircraft, (F2') is the projection of (F2) in the same plane.

The angles between the (Z) axis and (F1') and (F2'), (i) and (k) respectively, are equal. The angles (o) and (q) are the angles between (F1) and (F1'), and between (F2) and (F2').

The conditions for the aircraft to turn only around the roll axis are:

$$F3\ \text{Cos}(n)+F4\ \text{Cos}(m)+F1\ \text{Cos}(j)\text{Cos}(o)+F2\ \text{Cos}(k)\ \text{Cos}(q)=W=Fz$$

With F3=F4 and equal angles (n) and (m).

$$2F3\ \text{Cos}(n)+F1\ \text{Cos}(j)\text{Cos}(o)+F2\ \text{Cos}(k)\ \text{Cos}(q)=W=Fz$$

Another condition is that the force on the lateral axis is 0:

$$2F3\ \text{Sin}(n)+F1\ \text{Cos}(o)\text{Sin}(j)+F2\ \text{Cos}(q)\text{Sin}(j)=0$$

And: $Fx=F1\ \text{Sin}(o)+F2\ \text{Sin}(q)=0$

Because angles (p) and (n) are equal, for the moments we have:

$$Mx=LF1\ \text{Cos}(j+n)\text{Cos}(o)+LF2\ \text{Cos}(j+n)\text{Cos}(n)$$

$$My1=S(F3+F4)=0$$

The moment on Z is:

$$Mz=LF1\ \text{Cos}(j)\text{Sin}(o)+LF2\ \text{Cos}(j)\text{Sin}(q)=0$$

This is a more complicated case than the previous ones, but it proves that it is possible to make an independent rotation around the (X) axis, F1 being able to be used as a predefined function of F2.

The preferred embodiment comprises several safety features, the main one being the use of a ballistic parachute (not shown in the figures) for the entire aircraft that works well in the case of a fall at more than 30 m above ground level. In this example of the preferred embodiment the chute weighs just 6 Kg and can withstand an aircraft with 340 kg. All embodiments of present invention use this safety feature.

Because of the small size of the propellers the aircraft cannot carry out an autorotation in the event of engine failure. Because of this, when one of the main engines fails, the aircraft automatically turns off the other main engine. This action minimizes the rotation around (Z) axis and also (X) axis if one engine remains at work. After shutting down the remaining engine the aircraft deploys the ballistic parachute, this operation also being able to be pilot controlled.

The preferred embodiment can be done in a hybrid version, which uses one explosion engine (Ecofly with 100 Hp and about 65 Kg) to drive ten electrical engines Predator Plettenberg used as electrical generators to supply electrical power to five electrical engines per main propeller. These electrical engines are identical to the generators because there brushless and they weigh 1.5 Kg and can output 10 KW. The auxiliary propellers are moved by the same engines as the previous version or by the Predator engines. This is also a version for one pilot with about 100 Kg maximum, this version being able to have maximum weight of 320 Kg. This version has the significant advantage that in the event of the failure of one electrical engine the other four engines can keep the aircraft flying without any problems, this being a very effective security feature.

One other version of the first embodiment is the toy version. It uses four GW/IPS-DX-1XCS electrical engines with propellers 10×4.7" direct and inverse, with two GWS PICO servos for each main propeller tilt and one (or two) GWBPA001 batteries. The toy weigh about 400 g. The toy control uses the control of FIG. 17 but only in the MANUAL mode, however it also can use a more efficient control.

Figure 10:
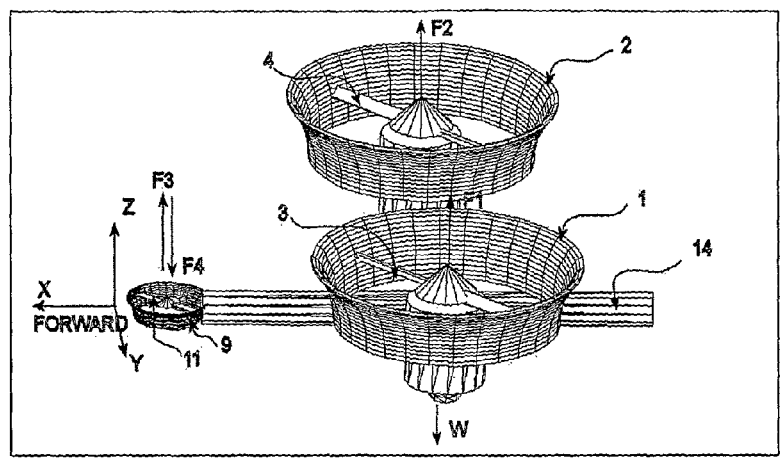
FIG. 10 is another simplified embodiment with only one thruster as auxiliary thrust unit.

FIG. 10 is another embodiment (simplified version of first embodiment). Again (X) is the forward axis, (Y) the lateral axis and (Z) the vertical axis of the aircraft. This embodiment comprising only one auxiliary thrust device, this being in fact the most simple embodiment of the present invention, the auxiliary shroud 9 and the auxiliary propeller 11 (can produce upward force (F3) or downward force (F4) by pitch change) the left main shroud 1 and the left main propeller 3 produce lifting force (F1), the right main shroud 2 and the right main propeller 4 produce lifting force (F2), the weight (W) is applied at the Cg (not shown), 14 is the longitudinal aircraft support, simplified in order to better explain the invention.

The upward and downward forces on the auxiliary thrusters are obtained through the use of two electric engines (or other kind of engines) that drive two independent propellers, one in the clockwise direction and the other in the counter clockwise direction, or alternatively just one engine and a single propeller with enough pitch change capability to produce sufficient upward or downward forces (maintaining the same rotation direction).

Figure 11:
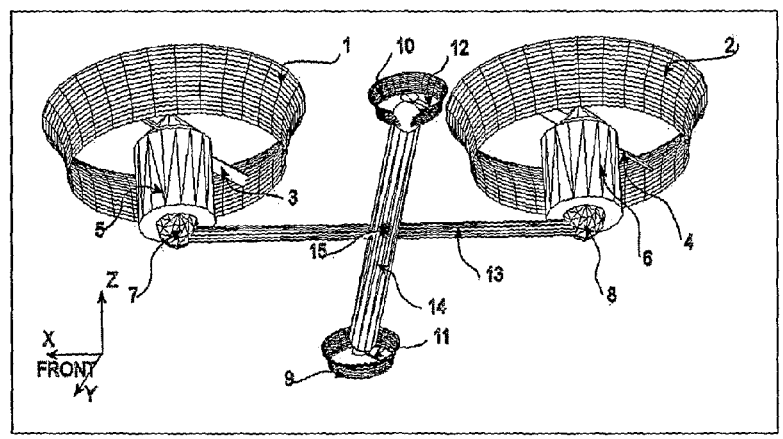
FIG. 11 is a simplified bottom view representation of another embodiment.

FIG. 11 is a perspective bottom view of one embodiment of present the invention, the (X) axis is the forward axis (longitudinal axis), the (Y) axis is the lateral axis and the (Z) axis is the vertical axis of the aircraft. In this embodiment the aircraft is rotated 90° around the vertical axis relatively to the preferred embodiment. The aircraft comprises a fontal shroud 1 with its propeller 3 rotating in an opposite direction of propeller 4 inside back shroud 2. Engine 5 rotates propeller 3 and is tilted around two axis, pitch and roll, by tilting mechanism (not shown in detail) 7, engine 6 rotates propeller 4 and is also tilted around two axis, pitch and roll, by tilting mechanism 8. Both thrusters have enough thrust capability to lift the aircraft. The main thrusters and engines and tilting mechanisms are supported by rod 13 which passes through (or at close vicinity of) Cg, at a cross angle with the support 14 for the auxiliary thrusters. On the left side of the aircraft there is provided a shroud 10 with its propeller 12 and on the right side the auxiliary shroud 9 and propeller 11. The aircraft operates in the same manner as the preferred embodiment but with two axis exchanged (X) and (Y).

Figure 12:
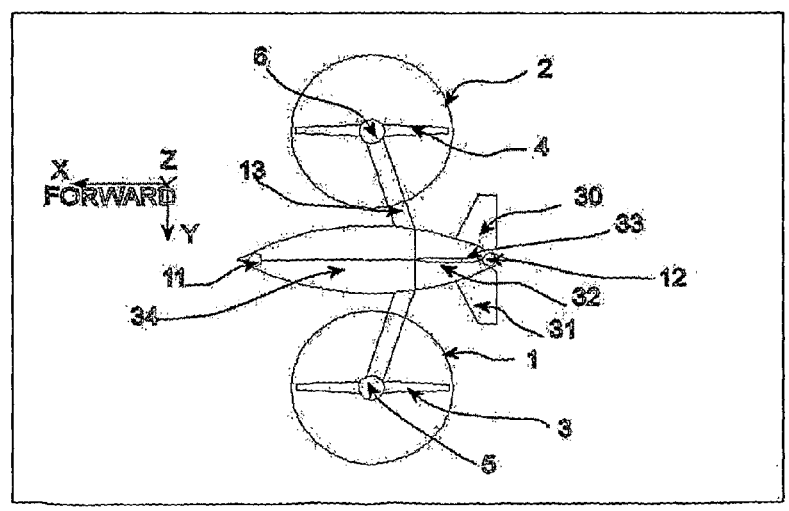
FIG. 12 is a simplified view of the preferred embodiment of FIG. 1 applied to an aircraft.

FIG. 12 is a top view of the present invention's preferred embodiment of FIG. 1 applied to an aircraft. (X) is the forward axis, (Y) the lateral axis and (Z) the vertical axis. Left shroud 1 has propeller 3 driven by engine 5, the right shroud 2 uses propeller 4 driven by engine 6, the tilting mechanisms are not visible in FIG. 12. The front auxiliary thruster is item 11 and the back auxiliary unit is item 10. The auxiliary units are placed at the maximum distance from Cg (not shown in FIG. 12) in order to maximize moment around (Y) axis (pitch). The aircraft comprises a structural support 13 to support the main units, at the back there is provided a right horizontal stabilizer 30 and a left horizontal stabilizer 31, a vertical stabilizer 32 and a rudder 33. In this configuration the aircraft has three independent axis translational control and three independent axis rotational control and also uses rudder control. The occupant, in the present version, sits on 34 with its Cg placed at the aircraft Cg or in close vicinity. With more power on the main and auxiliary units more load capacity is possible.

One additional safety feature of the complete aircraft is the rudder control. This helps the yaw control axis.

Figure 13:
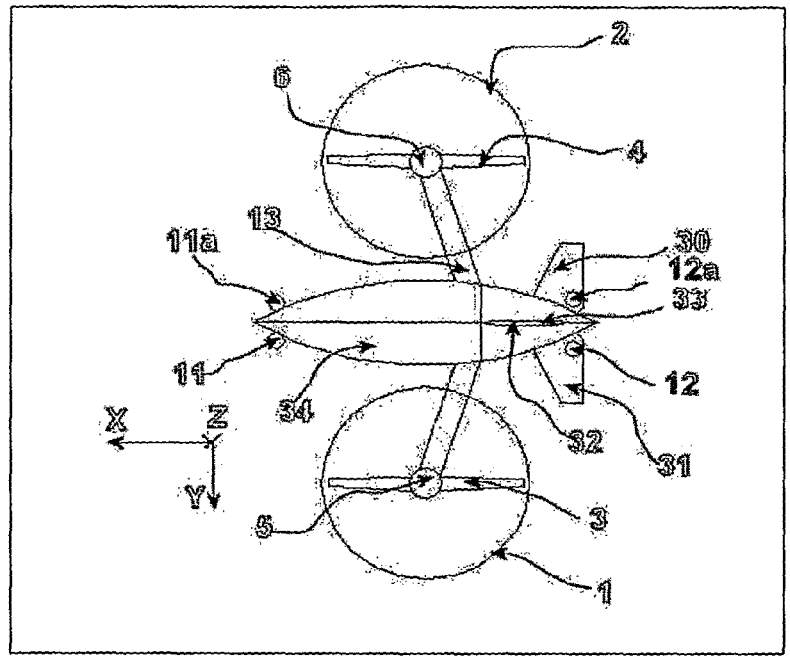
FIG. 13 is a simplified view of another embodiment applied to an aircraft, with two front auxiliary thrusters and two rear thruster.

FIG. 13 shows another embodiment of present invention, in which each of the auxiliary thrusters is double and is placed symmetrically to the aircraft roll axis.

The aircraft is provided, at the front, with the auxiliary thrusters 11a and 11 and in the back with the auxiliary thrusters 10 and 10a, and everything else in this embodiment is identical to the embodiment of FIG. 10.

Figure 14:
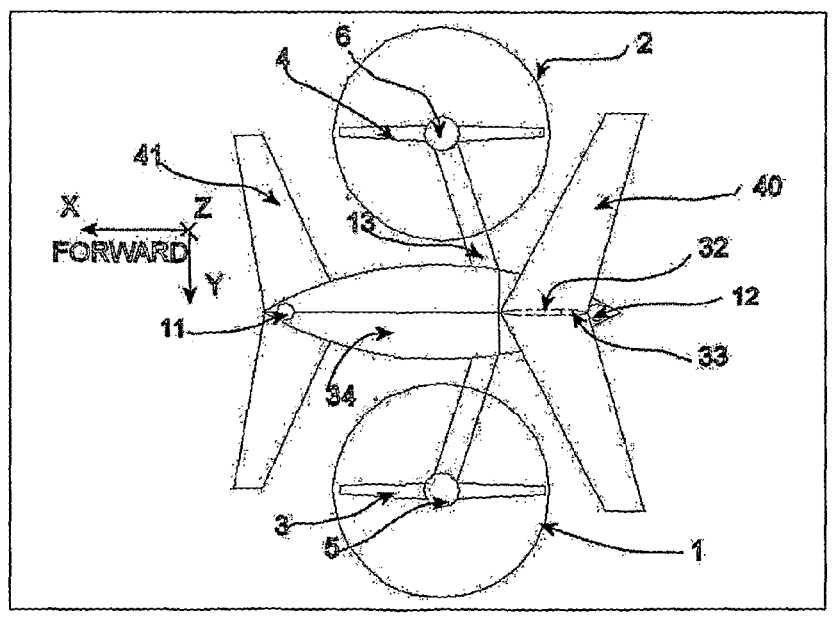
FIG. 14 is a simplified top view of the preferred embodiment of FIG. 1 applied to a convertible aircraft with wings.

FIG. 14 is the plan view of the embodiment of FIG. 1 of the present invention applied to a convertible aircraft. Because of the central position (or in close vicinity) of the Cg and also of the central position of the main propulsive units, the aircraft uses an unusual tandem wings configuration. In this case the front wings are placed below the back wings, (the reverse is also possible) which are mounted on top of the vertical stabilizer of the aircraft, this decreasing the thrusters interference in the wings.

The aircraft uses left shroud 1 and propeller 3, which is driven by engine 5, to produce the left thrust and shroud 2 and propeller 4, driven by engine 6, to produce the right thrust, both main units being supported by structure 13. The main units can be tilted around pitch and roll axis by their tilting mechanism (not shown on FIG. 14). The aircraft comprises a front auxiliary thruster unit 9 and a back auxiliary thrust unit 10.

Main units can be tilted at least 90° around the pitch axis (forward) for the aircraft to operate as a normal airplane. The front wing 41 and the back wing 40 can produce all the thrust needed for the vehicle to be airborne and performing a horizontal displacement when its speed is enough, 34 is the occupants space.

The aircraft control in helicopter and airplane mode is always done by the full vector control, and in the airplane mode it uses also rudder 33 attached to vertical stabilizer 32 to improve the yaw control.

The aircraft can also have, in more elaborate versions, full airplane control surfaces.

Figure 15:
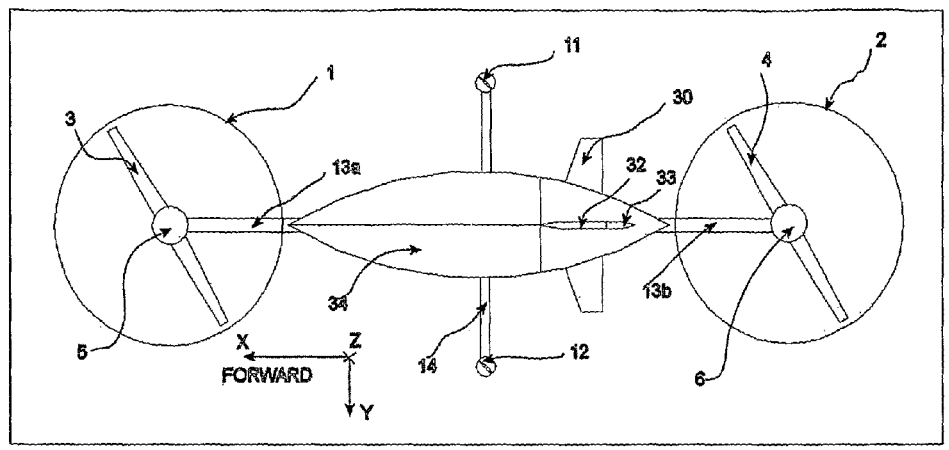
FIG. 15 is a simplified top view of the embodiment of FIG. 11 applied to an aircraft.

FIG. 15 is the top view of the embodiment of FIG. 11 applied to an aircraft. In FIG. 15 the main thruster are placed at front and back of the aircraft and the auxiliary ones laterally. Shroud 1 comprises propeller 3, which is rotated by engine 5, these front unit being supported by structure 13*a*. At the back there is provided a shroud 2 which has a propeller 4, rotated by engine 6, this unit being supported by 13*b*. The left auxiliary unit uses propeller 12 and the right auxiliary unit uses propeller 11, both being supported by 14. The aircraft comprises a horizontal stabilizer 30 and a vertical stabilizer 32 attached to rudder 33. The rudder is an independent control (but can be used in conjunction with the yaw control by the aircraft main controller). The motion control is the same as in the preferred embodiment with the controls for lateral rotation performed by the main units whilst the controls for the longitudinal roll are performed by auxiliary units.

Figure 16:
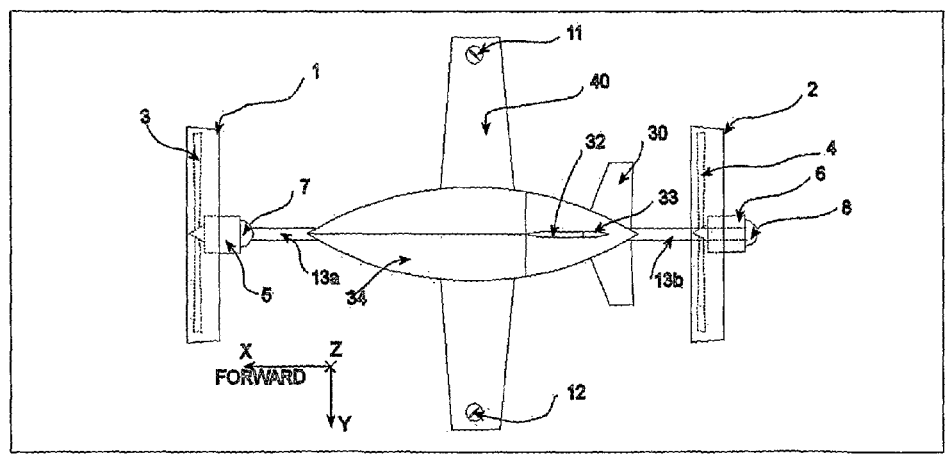
FIG. 16 is a simplified top view of the embodiment of FIG. 11 applied to an aircraft with wings with conversion capability.

FIG. 16 is a top view of the embodiment of FIG. 11 as a convertible, in airplane mode. The main units are placed in the front of the aircraft. In this configuration the aircraft comprises central wings 40 (like normal airplanes). The auxiliary units are located at the end (or in close vicinity) of the wings, left auxiliary unit 12 and right auxiliary unit 11 are also located at the end (or in close vicinity) of the wings. Support 13*a* of the front unit is mounted at the centre line of the aircraft and the support 13*b* of the back main thruster unit is mounted below and has a rod connected thereto at in a right angle (not shown) in the up direction, this allowing tilting of at least 90° of the back unit.

The airplane comprising a front thrust unit supporting structure 13*a* attached to tilting mechanism 7 attached to front engine 5, which rotates propeller (dashed lines) 3 inside shroud 1.

The back support 13*b* supports the tilting mechanism 8 attached to engine 6 which rotates propeller 4 inside shroud 2. Occupants are placed at space 34, at the back of the aircraft there is the horizontal stabilizer 30 and vertical stabilizer 32 and rudder 33. The aircraft also comprising, in more elaborate versions, full airplane control surfaces.

FIG. 17 is a block diagram representation of the controller system of the present invention in the Automatic/Manual selection part.

The controller has a MANUAL/AUTO 200 switch. In the normal AUTO LO position switches 202 (from top to bottom of FIG. 17) are set to the CONTROLLER 203 position, so the controller 203 controls all the flight actuators in vector mode: front auxiliary unit RPM or propeller change "AUX L" 212, left main unit RPM or propeller pitch change "MAIN L" 213, Y tilt (roll) of left main unit "Act Y1" 214, left main X tilt (pitch) "Act X1" 215, right main Y tilt actuator "Act Y2" 216, right main roll X tilt actuator "Act X2" 217, right main unit RPM or propeller pitch change "MAIN R" 218 and back auxiliary unit RPM or propeller change "Aux R" 219.

The controller receives data from sensors 204 and the user commands X 205, Y 206, Z 207, X aircraft rotation (roll) 208, Y rotation 209, Z rotation 210 and power 211. The controller uses these variables to compute the necessary actuator controls when MANUAL/AUTO 200 is at AUTO position.

In the event of a complete controller failure the user can set 200 to MANUAL position. In this position the commands to the actuators come directly (with simple arithmetic operations independent of the aircraft controller,) from user commands.

The X translation command goes to SUM block 222 and 223. In 222 the X signal is summed to the Z rotation command and in 223 subtracted by Z rotation command.

Output of 222 (X+Rotation Z) goes direct to "Act Y1" 214 and output of 223 (X−Rotation Z) goes to "Act Y2" 216. The X translation and the Z rotation are assured.

The POWER 211 command is sent directly as sum input to sum blocks 220, 221, 224 and 225.

The Y translation command is sent directly to "Act X1" 215 and to "Act X2" 217. Z command is not connected in MANUAL mode.

The X roll command is summed in 221 to the POWER signal, the output of the sum is then sent to "Main L" 213 RPM or pitch change control, X roll is also subtracted in 224 to the power signal, the output of the subtraction is then sent to "MAIN R" 218 RPM or pitch change control. The Y rotation command is summed to the power signal in sum 220 which connects to "Aux L" 212 RPM or pitch change control, Y rotation command is also sent to 225 (where it is subtracted to the power signal), and its output controls "Aux R" 219 auxiliary unit RPM or prop pitch change.

This implementation allows a perfect X, Y, Z translation control (with POWER replacing Z command) and an also perfect Z axis rotation control. The X roll and Y pitch rotations are not perfect because the yaw moment (generated by the different Main RPM or the different auxiliary RPM) is not compensated. Even so it is possible to get a reasonable Roll and Pitch control of the aircraft in MANUAL mode.

It is to be understood that the present invention is not limited in its application to the details of the construction and the arrangement of the components described in the description or in the drawings.

The invention is able to adopt other embodiments or of being implemented or carried out in various ways. Also, it is to be understood that the phraseology and terminology employed herein are for the purpose of description only and should not be regarded as limiting.

It should be appreciated that the one skilled in the art, taking into account the teachings of the present invention, will be able to make numerous variations, changes and equivalents without departing from the scope of the present invention as set forth in the claims.

The invention claimed is:

1. A propulsion system connected to a vehicle, said vehicle able to move inside a fluid or vacuum with three independent translation axis movements and three independent rotation axis movements, comprising at least two main thrusters, connected to the vehicle by means for attaching comprising tilting mechanisms and means for joining, said tilting mechanisms tilting the main thrusters around two axes, pitch and roll, independently from each other, wherein a geometric center of an arrangement of said tilting mechanisms is located at or in close vicinity of a mass center of the vehicle, and in that the system comprises at least one auxiliary thruster connected to the vehicle by the means for joining, wherein the at least one auxiliary thruster and the tilting mechanisms of the main thrusters define a geometrical figure shaped, approximately, as an equilateral triangle or as a diamond, said triangle or diamond lying on a horizontal plan, defined by longitudinal (roll) and lateral (pitch) axes of the vehicle, the at least one auxiliary thruster and the tilting mechanisms of the said main thrusters being disposed at apexes of said geometrical figure in such a way that the geometrical center of said figure is disposed on a longitudinal axis of the vehicle, wherein the at least one auxiliary thruster is fixed with thrust perpendicular or nearly perpendicular to the roll and pitch axes of the vehicle, the vehicle also being provided with means for controlling configured to control the thrusters and their corresponding tilting mechanisms.

2. The propulsion system according to claim 1, further comprising two main thrusters, each placed laterally from the roll axis of the vehicle and symmetrically and perpendicular to the roll axis of the vehicle, and having one auxiliary thruster fixed and not tiltable, placed on or at close vicinity of an end of the vehicle roll axis, with thrust perpendicular or nearly perpendicular to the roll and pitch axes of the vehicle.

3. The propulsion system according to claim 1, further comprising two main thrusters, each placed laterally from the roll axis of the vehicle and symmetrically and perpendicular to the roll axis of the vehicle, and having two auxiliary thrusters, fixed and not tiltable, placed at or in close vicinity of front and rear ends of the roll axis of the vehicle, with thrust perpendicular or nearly perpendicular to the roll and pitch axes of the vehicle.

4. The propulsion system according to claim 1, further comprising two main thrusters, each placed laterally from the roll axis of the vehicle and symmetrically and perpendicular to the roll axis of the vehicle, and having both auxiliary thrusters, fixed and not tiltable, placed at or in close vicinity of front or rear ends of the vehicle, with thrust perpendicular or nearly perpendicular to the roll and pitch axes of the vehicle.

5. The propulsion system according to claim 1, further comprising two main thrusters, wherein one of the main thrusters is placed at or in close vicinity of the front end of the vehicle roll axes and the other of said main thrusters is placed at or in close vicinity of the rear end of the vehicle roll axis, the system further comprising two auxiliary thrusters, each placed laterally from the roll axis of the vehicle, and symmetrically and perpendicularly to the roll axis of the vehicle, the geometric center of said fixed thrusters arrangement being located at or in close vicinity of the mass center of the vehicle, with thrust perpendicular or nearly perpendicular to the roll and pitch axes of the vehicle.

6. The propulsion system according to claim 1, wherein the thrusters are selected from the following group: propellers, jets, fans, rockets, magnet thrusters, electric thrusters, turbines or any other propulsion system.

7. A propulsion process for a propulsion system of a vehicle, the system able to move the vehicle along three independent translation axes and around three independent rotation axes, wherein the propulsion system is connected to the vehicle and the vehicle is able to move inside a fluid or vacuum with three independent translation axes movements and three independent rotation axes movements, the system comprising at least two main thrusters, connected to the vehicle by means for attaching comprising tilting mechanisms and means for joining, said tilting mechanisms tilting the main thrusters around two axes, pitch and roll, independently from each other, wherein a geometric center of an arrangement of said tilting mechanisms is located at or in close vicinity of a mass center of the vehicle, and in that the system comprises at least one auxiliary thruster connected to the said vehicle by the means for joining, wherein the at least one auxiliary thruster and the tilting mechanisms of the said main thrusters define a geometrical figure shaped, approximately, as an equilateral triangle or as a diamond, said triangle or diamond lying on a horizontal plan, defined by longitudinal (roll) and lateral (pitch) axes of the vehicle, the at least one auxiliary thruster and the tilting mechanisms of the main thrusters being disposed at apexes of said geometrical figure in such a way that the geometrical center of said figure is disposed on a longitudinal axis of the vehicle, wherein the at least one auxiliary thruster is fixed with thrust perpendicular or nearly perpendicular to the roll and pitch axes of the vehicle, the vehicle also being provided with means for controlling configured to control the thrusters and their corresponding tilting mechanisms, the process comprising:

translational movements over the horizontal plan are achieved by tilting all the main thrusters, around their tilt axes, which are perpendicular to the intended translational movement, and also by changing the global thrust of the thrusters in such a way as to maintain vehicle altitude;

translational movement along a vertical axis is accomplished by having all the main thrusters in a vertical tilt position, by increasing the thrust of all the thrusters so that their combined thrust is greater than a weight of the vehicle for it to ascend, and by reducing the thrust to less than the vehicle weight for the vehicle to descend;

rotation around the vertical axis is accomplished by tilting the main thrusters around the same axis connecting the tilting mechanisms, at an equal angle in modulus but with opposite signal of a main thruster in relation to its opposed main thruster, and also by changing the thrusters overall thrust to maintain altitude;

rotation around the axis defined by the means for attaching of the tilting mechanisms of two main thrusters is accomplished by varying the thrust in the auxiliary thruster(s), the main thrusters tilting in the opposite sense to that of the rotation of the vehicle and also by changing the thrust of the thrusters in order to maintain altitude;

rotation around an axis orthogonal to the previous axis and the vertical axis is accomplished by a different thrust in the main thrusters and by tilting the same in the sense opposite to vehicle rotation and also by changing the thrust of the thrusters in order to maintain altitude; and wherein, when using propellers as thrusters, these being placed opposed to each other, the propellers turning in opposite directions in order to compensate torque over the vehicle.

8. The propulsion process according to claim 7, wherein the system further comprises two main thrusters, each placed laterally from the roll axis of the vehicle and symmetrically and perpendicular to the roll axis of the vehicle, and having one auxiliary thruster fixed and not tiltable, placed on or at close vicinity of an end of the vehicle roll axis, with thrust perpendicular or nearly perpendicular to the roll and pitch axes of the vehicle, wherein the process further comprises:

independent forward or backward motion is accomplished by tilting the main thruster around the pitch axis at the same angle (a), by increasing the thrust with equal value in both thrusters, in such a way that the vector sum of the vertical thrust equals the weight of the vehicle thus maintaining the altitude of the aircraft;

independent lateral motion is accomplished by tilting the main thrusters at the same angle(b1), around the roll axis, and by increasing the thrust in such a way that the vector sum of the vertical thrusts equals the weight of the vehicle in order to maintain altitude;

independent diagonal motion is accomplished by combining tilting of the main thrusters at the same angle (b1), around the roll and pitch axes, again with the increase of the thrust in such a way that the vector sum of the vertical thrust equals the weight of the vehicle thus maintaining altitude;

independent upward or downward motion is accomplished by assuming a vertical position of the main thrusters and by equally increasing the vertical thrust producing forces on the vertical axis (yaw) that can be greater or lesser than the weight of the vehicle;

independent rotation around the yaw (vertical) axis is accomplished by tilting the main thrusters around the pitch axis (this axis being the same connecting the tilting mechanisms of the main thrusters), at angles (c, d) that are equal in modulus but with opposite signal, and also by increasing the thrust thus maintaining altitude;

independent rotation around the pitch axis of the vehicle is accomplished by using the auxiliary thruster thus creating a propulsive force by generating thrust on the auxiliary thruster, this propulsive force being able to be directed upward or downward, and when using propellers as thrusters, the upward or downward force is produced by two counter-rotated propellers, or by a single propeller rotating in two possible directions, or by propeller pitch change maintaining the rotation direction, wherein, in order for the vehicle to stay in the same spatial translational position of the mass center, the main thrusters are tilted around the pitch axis at angles (g) and (e) in opposite direction to the vehicle rotation, these angles being the same if the auxiliary thruster does not generate any torque and different if they do, and the main thrusters change their thrust to maintain the altitude; and independent rotation around the roll axis of the vehicle is accomplished by using different impulsive forces of the main thrusters, wherein in order for the vehicle to maintain the same spatial translational position of the mass center, the main thrusters are tilted around the roll axis in the opposite direction of the vehicle rotation, at equal angles (k, j) if there is no resulting torque from the main thrusters, and if there is resulting torque, then the main thrusters are also tilted around the pitch axis with angles (q, o), in order to compensate the elevation of the axis connecting the auxiliary thrusters, and changing the main thrusters thrust thus maintaining altitude.

9. The propulsion process according to claim 7, wherein the system further comprises two main thrusters each placed laterally from the roll axis of the vehicle and symmetrically and perpendicularly to the roll axis of the vehicle, wherein two auxiliary thrusters fixed and not tiltable, placed at or in close vicinity of front and rear ends of the roll axis of the vehicle, with thrust perpendicular or nearly perpendicular to the roll and pitch axes of the vehicle, wherein the process further comprises:

independent motion forward or backward is accomplished by tilting the main thrusters around the pitch axis at the same angle (a), by increasing the thrust with equal value in both thrusters, in such a way that the vector sum of the vertical thrust equals the weight, thus maintaining the altitude;

independent lateral motion is accomplished by tilting the main thrusters at the same angle (b1), around the roll axis, and by increasing the thrust in such a way that the vector sum of the thrust equals the weight of the vehicle thus maintaining altitude;

independent diagonal motion is accomplished by combining tilting of the main thrusters around the roll and pitch axis, again with the increase of thrust in such a way that the vector sum of the vertical thrust equals the weight of the vehicle thus maintaining altitude;

independent upward or downward motion is accomplished by assuming vertical position of the main thrusters and by increasing equally the vertical thrust producing forces on the vertical axis (yaw) that can be greater or lesser than the weight of the vehicle;

independent rotation around the yaw (vertical) axis is accomplished by tilting the main thrusters around the pitch axis (this axis being the same connecting the tilting mechanisms of the main thrusters), at angles (c, d) that are equal in modulus but with opposite signal, and also by increasing the thrust thus maintaining altitude;

independent rotation around the pitch axis of the vehicle is accomplished using auxiliary thrusters with different thrusts, in such a way that for maintaining the same spatial translational position of the mass center of the vehicle, the main thrusters are tilted around the pitch axis in the opposite direction to that of the vehicle tilt, at angles (g) and (e), these angles being equal if the auxiliary thrusters do not generate any torque and different if they do, and the main thrusters changing their thrust thus maintaining the altitude; and independent rotation around the roll axis of the vehicle is accomplished using different impulsive forces of the main thrusters, wherein, in order to maintain the same spatial translational position of the mass center of the vehicle, the main thrusters are tilted around the roll axis in the opposite direction of the vehicle rotation, at angles (k, j) that are equal if there is no resulting torque from the main thrusters, and if there is resulting torque, then the main thrusters are also tilted around the pitch axis at angles (q, o), it being necessary to change the main thrusters thrust thus maintaining altitude in order to compensate the elevation in the axis connecting the auxiliary thrusters.

10. The propulsion process according to claim 7, wherein the system further comprises two main thrusters each placed laterally from the roll axis of the vehicle and symmetrically and perpendicular to the roll axis of the vehicle, wherein both auxiliary thrusters, fixed and not tiltable, are placed at or in close vicinity of front and rear ends of the vehicle, with thrust perpendicular or nearly perpendicular to the roll and pitch axes of the vehicle, the process further comprising:

independent forward or backward motion is accomplished by tilting the main thrusters around pitch axis at the same angle (a), by increasing the thrust with equal value in both thrusters, in such a way that the vector sum of all thruster equals the weight of the vehicle thus maintaining altitude;

independent lateral motion is accomplished by tilting the main thrusters at the same angle (b1) around the roll axis, and by increasing the thrust in such a way the vector sum of the vertical thrust equals the weight of the vehicle thus maintaining altitude;

independent diagonal motion is accomplished by combining tilting of the main thrusters around the roll and pitch axis, again with the increase of thrust in such a way that the vector sum of the vertical thrusts equals the weight of the vehicle thus maintaining altitude;

independent upward or downward motion is accomplished by assuming vertical position of the main thrusters and by increasing equally the vertical thrust producing forces on the vertical axis (yaw) that can be greater or lesser than the weight of the vehicle;

independent rotation around the yaw (vertical) axis is accomplished by tilting the main thrusters around the pitch axis (this axis being the same connecting the tilting mechanisms of the main thrusters), at angles (c, d) that are equal in modulus but with opposite signal, and also by increasing the thrust thus maintaining altitude;

independent rotation around the pitch axis of the vehicle is accomplished by using one auxiliary thrusters with thrust in the upward direction, perpendicular to the vehicle roll axis, or downward thrust in another auxiliary thruster, or vice versa, in such a way that for maintaining the same spatial translational position of the mass center of the vehicle, the main thrusters are tilted around the pitch axis in the opposite direction to the vehicle tilt, at angles (g) and (e), these angles being equal if the auxiliary thrusters do not generate any torque and different if they do, and changing the main thrusters thrust thus maintaining altitude; and independent rotation around the roll axis of the vehicle is accomplished using different impulsive forces of the main thrusters, wherein in order for the vehicle to maintain the same spatial translational position of the mass center, the main thrusters are tilted around the roll axis in the opposite direction of the vehicle rotation, at equal angles (k, j) if there is no resulting torque from the main thrusters, and if there is a resulting torque, then the main thrusters are also tilted around the pitch axis with angles (q, o), in order to compensate the elevation of the axis connecting the auxiliary thrusters, and changing the main thrusters thrust thus maintaining altitude.

11. The propulsion process according to claim 7, for a system further comprising two main thrusters wherein one of said main thrusters is placed at or in close vicinity of the front end of the vehicle roll axes and the other of said main thrusters is placed at or in close vicinity of the rear end of the roll axis of the vehicle, and further comprising two auxiliary thrusters are each placed laterally from the roll axis of the vehicle, and symmetrically and perpendicularly to the roll axis of the vehicle, the geometric center of said fixed thrusters arrangement being located at or in close vicinity of the mass center of the vehicle, with thrust perpendicular or nearly perpendicular to the roll and pitch axes of the vehicle, the process further comprising:

independent motion forward or backward is accomplished by tilting the main thrusters around the pitch axis at an equal angle (a), and by increasing the thrust using equal value in both thrusters, in such a way that the vector sum of the main thrusters is the same as the weight of the vehicle, thus maintaining the altitude of the aircraft;

independent lateral motion is accomplished by tilting the main thrusters or propellers equally at an angle (b1) around the roll axis, and simultaneously increasing the thrust, in such a way that the vector sum of the vertical thrust equals the weight of the vehicle thus maintaining altitude;

independent diagonal motion is accomplished by combining tilting of the main thrusters around the roll and pitch axes, again with the increase of thrust in such a way that the vector sum of the vertical thrust equals the weight of the vehicle thus maintaining altitude;

independent upward or downward motion is accomplished by assuming vertical position of the main thrusters and by increasing equally the vertical thrust producing forces on the vertical axis (yaw) that can be greater or lesser than the weight of the vehicle;

independent rotation around the yaw (vertical) axis is accomplished by tilting of the main thrusters around the roll axis, at equal angles in modulus, but with opposite signal, and also by increasing the thrust thus maintaining altitude;

independent rotation around the pitch axis of the vehicle is accomplished by using the main thrusters with different thrusts, in such a way that for maintaining the same spatial translational position of the mass center of the vehicle, the main thrusters are tilted in the opposite direction to that of the vehicle tilt, at angles (g) and (e), these angles being equal if the main thrusters do not generate any torque and different if they do, and changing the main thrusters thrust thus maintaining altitude; and independent rotation around the roll axis of the vehicle is accomplished using different impulsive forces of the auxiliary thrusters, in such a way that for the vehicle to maintain the same spatial translational position of the mass center, the main thrusters are tilted, around the roll axis, in the opposite direction of the vehicle rotation, at equal angles (q, o) that are equal if there is no resulting torque from the main thrusters, and if there is resulting torque, then the main thrusters are also tilted around the pitch axis, being necessary to change the auxiliary thrusters thrust for stabilizing the altitude in order to compensate the elevation of the axis that connects the auxiliary thrusters.

12. A propulsion process according to claim 11, wherein the direct electrical control of the actuators, in the event of absence of failure of the at least one controller is made in manual mode by using eight independent switches commuting the position of the controller output to manual output, the power of any thruster being altered by changing RPM (rotations per minute) or propeller pitch or thrust, the outputs for the control of the vehicle being the following:

left main thruster power, right main thruster power, front auxiliary thruster power, rear auxiliary thruster power and, also, roll tilt of left main thruster and the pitch tilt of the left main thruster, roll tilt of the right main thruster and the pitch tilt of the right main thruster;

in which the power of the right main thruster will be equal to the measured signal of the command of power subtracted to the measured signal of the command of roll rotation of the vehicle;

the power of the left main thruster will be equal to the measured power command signal added to the measured rotation command signal of the vehicle around the roll axis;

the power of the front auxiliary thruster will be the measured power command signal plus the measured pitch rotation command signal of the vehicle around pitch axis;

the power of the rear auxiliary thruster will be equal to the measured power command signal subtracted to the measured pitch rotation command signal;

the signal of roll of left main thruster is given by the sum of the frontal translation signal with the yaw rotation signal;

the signal of right main thruster pitch tilt is given by the measured frontal translation signal subtracted to the measured yaw rotation signal of the vehicle; and the roll rotation signal of the left and right main thrusters are equal and are given by the measured lateral translation signal, wherein any one of these commands can be affected by a multiplicative factor that can be different for each one in order to improve the accuracy of the control of the vehicle in the MANUAL mode.

13. The propulsion process according to claim 7, wherein the electrical control of the actuators is done by at least one controller in a majority decision process that receives information about:

parameters of position of the roll axis, position of the yaw axis, position of the pitch axis, velocity in X (forward), in Y (sideways) and Z (up) and respective accelerations, pitch and roll tilt of the thrusters and their RPM or propeller pitch, and respective thrusts and torque, the air speed, temperature, pressure, altitude, the forces internal resultant and torques acting on the vehicle;

user commands, and constantly calculating the actual mass center Cg, the control algorithm being any one allowing the control in three independent translational axis (X, Y, and Z) and three independent rotational axis (rotation around X, Y, and Z), minimizing the external disturbances.

14. The use of a propulsion system and propulsion process according to claim 7, in an aircraft with tandem wings placed at the front and the back of the airplane wherein the front wing is lower than rear wing (or the opposite) in such a way as to minimize the wings influence on the propulsive airflow from the main thrusters in takeoff or in horizontal cruise, said main thrusters being able to tilt ninety degrees or more around the pitch axis in order to allow the aircraft to be a convertible, capable of flying like an aircraft in cruise flight, and as an "helicopter" in takeoff and landing, the wings overall lift force being located at or in close vicinity of the Cg, the aircraft in this configuration having a vertical stabilizer and a directional rudder that can be used in coordination with the normal vector control, the aircraft being able to also have all the normal airplane controls.

15. The use of a propulsion system and propulsion process according to claim 7, in an aircraft with wings placed similarly to conventional airplanes, near Cg, wherein the aircraft can be used like a convertible, in which case the control is done by the vector main and auxiliary thrusters and by the directional rudder, and it can also have all the control surfaces of a conventional airplane.

16. The use of a propulsion system and propulsion process according to claim 7 in a vehicle moving inside a fluid or vacuum.

17. The use of a propulsion system and propulsion process according to claim 7, in a toy, an UAV, a submarine vehicle, a ROV or a spacecraft.

\* \* \* \* \*